US009734599B2

(12) United States Patent
Liu et al.

(10) Patent No.: US 9,734,599 B2
(45) Date of Patent: Aug. 15, 2017

(54) CROSS-LEVEL IMAGE BLENDING

(71) Applicant: Microsoft Corporation, Redmond, WA (US)

(72) Inventors: Dingding Liu, Bellevue, WA (US); Thomas Donald Barclay, Westminster, CO (US); Bimal K. Mehta, Sammamish, WA (US); Wolfgang Schickler, Boulder, CO (US); Kartik Muktinutalapati, Bellevue, WA (US); Khomkrit Kaowthumrong, Highlands Ranch, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 235 days.

(21) Appl. No.: 14/509,519

(22) Filed: Oct. 8, 2014

(65) Prior Publication Data

US 2016/0104301 A1    Apr. 14, 2016

(51) Int. Cl.
*G06T 11/00* (2006.01)
*G06T 11/60* (2006.01)
(Continued)

(52) U.S. Cl.
CPC .......... *G06T 11/001* (2013.01); *G06T 3/4053* (2013.01); *G06T 5/50* (2013.01);
(Continued)

(58) Field of Classification Search
USPC ........................................................ 382/284
See application file for complete search history.

(56) References Cited

U.S. PATENT DOCUMENTS 5,187,754 A * 2/1993 Currin ................. G06K 9/0063
                                                              375/E7.086
6,469,710 B1  10/2002 Shum et al.
(Continued)

OTHER PUBLICATIONS

Thomas, et al., "Color Balancing for Change Detection in Multitemporal Images", In IEEE Workshop on Applications of Computer Vision, Jan. 9, 2012, 6 pages. http://www3.nd.edu/~kwb/ThomasBowyerKareemWACV_2012.pdf.
(Continued)

*Primary Examiner* — Ishrat I Sherali
(74) *Attorney, Agent, or Firm* — The Watson IP Group, PLC; Vladan M. Vasiljevic

(57) ABSTRACT

One or more techniques and/or systems are provided for image blending and/or facilitating image transitions. In an example, a map interface displays map information, such as of a town, through a visualization. A first image having a first level of detail and a first image type (e.g., satellite imagery of the town) may be displayed through the visualization. While zoomed into the town, a second image having a second level of detail and a second image type (e.g., aerial imagery of the town) may be displayed through the visualization. Instead of merely transitioning the visualization from displaying the first image to displaying the second image (during zooming), which may otherwise provide a visually abrupt transition, one or more intermediate blended images, having intermediate levels of detail between the first image and the second image, may be generated and displayed during the transition between the first image and the second image.

19 Claims, 11 Drawing Sheets

(51) Int. Cl.
  *G06T 3/40* (2006.01)
  *G06T 5/50* (2006.01)
(52) U.S. Cl.
  CPC .............. *G06T 11/00* (2013.01); *G06T 11/60* (2013.01); *G06T 2207/10032* (2013.01); *G06T 2207/20016* (2013.01); *G06T 2207/20221* (2013.01)

(56) References Cited

U.S. PATENT DOCUMENTS

| | | | |
|---|---|---|---|
| 7,991,226 B2 | 8/2011 | Schultz et al. | |
| 8,189,959 B2* | 5/2012 | Szeliski | G06T 3/4038 382/284 |
| 8,340,415 B2* | 12/2012 | Hoppe | G06T 3/4007 382/162 |
| 8,340,423 B1* | 12/2012 | Zelinka | G06T 3/4038 382/173 |
| 8,374,428 B2 | 2/2013 | Lepikhin et al. | |
| 8,379,972 B1 | 2/2013 | Wang et al. | |
| 8,547,389 B2* | 10/2013 | Hoppe | G06T 5/50 345/589 |
| 8,577,139 B2 | 11/2013 | Chen et al. | |
| 8,625,890 B1* | 1/2014 | Brenner | 382/165 |
| 8,649,596 B2 | 2/2014 | Schultz et al. | |
| 8,665,266 B2 | 3/2014 | Vandrovec | |
| 2007/0024931 A1* | 2/2007 | Compton | H04N 9/045 358/512 |
| 2011/0243438 A1 | 10/2011 | Hoppe et al. | |
| 2013/0002810 A1 | 1/2013 | Stauder et al. | |
| 2013/0321399 A1 | 12/2013 | Rohlf | |
| 2013/0322702 A1 | 12/2013 | Piemonte et al. | |
| 2015/0363641 A1* | 12/2015 | Navulur | G06K 9/00476 382/113 |

OTHER PUBLICATIONS

Silva, et al., "Color Restoration of Aerial Photographs", In Special Applications of Photogrammetry, Apr. 25, 2012, 29 pages. http://cdn.intechopen.com/pdfs-wm/36192.pdf.

Siddiqui, Yusuf, "The Differential Superposition Method for Combining Imagery of Differing Sources and Resolutions", In Annual Conference ASPRS, May 1, 2006, 8 pages. http://www.asprs.org/a/publications/proceedings/reno2006/0138.pdf.

Han, et al., "Optimizing Continuity in Multiscale Imagery", In Journal of ACM Transactions on Graphics, vol. 29, No. 6, Dec. 2010, 9 pages. http://www.cs.columbia.edu/cg/continuity/continuity.pdf.

He, et al., "Guided Image Filtering", In IEEE Transactions on Pattern Analysis and Machine Intelligence, vol. 35, Issue 6, Oct. 2, 2012, 13 Pages.

Li, et al., "Image Fusion With Guided Filtering", In IEEE Transactions on Image Processing, vol. 22, Issue 7, Jan. 30, 2013, 12 Pages.

"International Search Report and Written Opinion Issued in PCT Application No. PCT/US2015/054101", Mailed Date: Jan. 29, 2016, 12 Pages.

* cited by examiner

CROSS-LEVEL IMAGE BLENDING

BACKGROUND

Many applications and/or websites provide information through map interfaces. For example, a running website may display running routes through a running map visualization; a mobile map app may display driving directions on a road map visualization; etc. Such applications and/or websites may allow a user to zoom-in, zoom-out, and/or rotate a viewing angle of a map visualization.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for image blending and/or for facilitating image transitions are provided herein. In an example of image blending, an intermediate blended image between a first image, having a first image type and a first level of detail, and a second image having a second image type and a second level of detail may be generated. The intermediate blended image may have an intermediate level of detail between the first level of detail and the second level of detail. In an example of generating the intermediate blended image, structure transfer may be performed upon the first image to generate a new image. The second image may be downsampled to generate a downsampled image having a downsampled size corresponding to a size of the new image. A color difference between the new image and the downsampled image may be computed. The color difference may be upsampled to generate an upsampled color difference. A gradient image may be blended using an interpolation weight and the upsampled color difference to generate the intermediate blended image. The intermediate blended image may be displayed through a visualization during transition between display of the first image and display of the second image.

In an example of facilitating image transitions, a second image, having a second image type and a second level of detail, may be subsampled to generate a subsampled image. The subsampled image may have a subsampled size corresponding to a first image having a first image type and a first level of detail. A color distance metric between the subsampled image and the first image may be determined. A structure similarity metric between the subsampled image and the first image may be determined. A transition blending metric may be generated based upon the color distance metric and the structure similarity metric. A set of images may be sorted based upon the transition blending metric to generate a sorted set of images ordered from smooth transitions to abrupt transitions between displaying the first image and displaying the second image.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
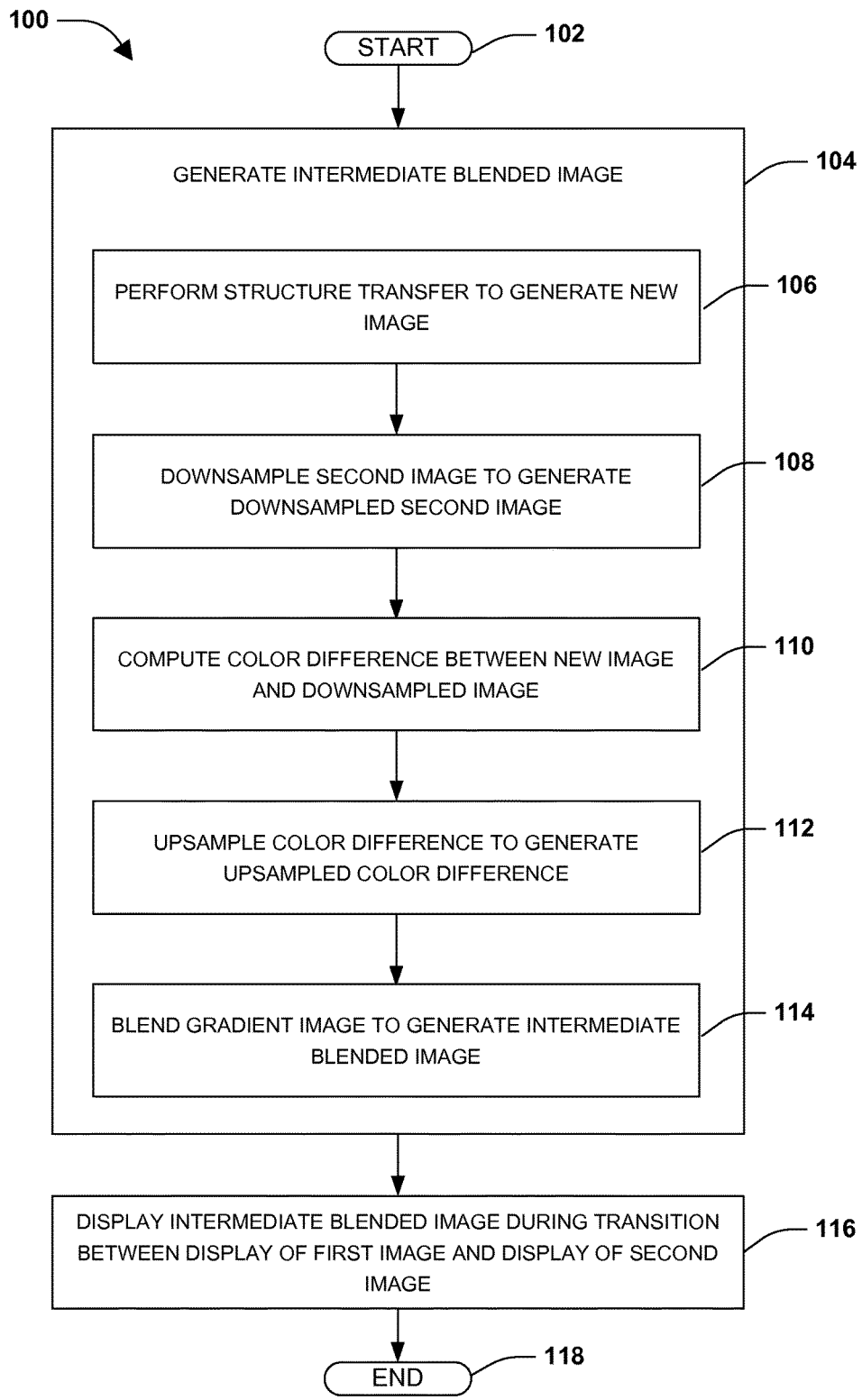
FIG. 1 is a flow diagram illustrating an exemplary method of image blending.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more techniques and/or systems for image blending and/or facilitating image transitions are provided herein. Users may desire to zoom into and/or out of a map without abrupt visual transitions that may occur when transitioning from a first map zoom level derived from a first type of image such as satellite imagery and a second map zoom level derived from a second type of image such as aerial imagery (e.g., a user may zoom into a map of the United States from a satellite view, derived from satellite imagery, to an aerial view derived from aerial imagery). However, many client devices and/or map providers may lack processing power, storage, and/or bandwidth to provide smooth visual transitions from the first map zoom level to the second map zoom level due to the different types of imagery data sources and different types of imagery being accessed, retrieved, and/or utilized for the transition. Accordingly, as provided herein, one or more intermediate blended images, having an intermediate level of detail between a first level of detail of a first image (e.g., a satellite image) and a second level of detail of a second image (e.g., an aerial image), may be generated for display during a transition between display of the first image and display of the second image. Because the one or more intermediate blended images are generated for display during the transition, a visually smooth transition may be provided.

An embodiment of image blending is illustrated by an exemplary method 100 of FIG. 1. At 102, the method starts. A map interface may display map information through a visualization (e.g., a mobile map app may display driving directions through a map visualization of a city). The map interface may utilize various types of imagery to populate the map visualization, such as satellite imagery for relatively zoomed out views of the city and aerial imagery for relatively zoomed in views of the city. The map interface may allow the user to zoom into and/or out of the visualization. In an example, while zooming in, the visualization may be transitioned from displaying views of the city using the satellite imagery to displaying views of the city using the aerial imagery. As provided herein, one or more intermediate blended images may be generated and/or displayed during the transition from the satellite imagery to the aerial imagery (e.g., from the satellite imagery to the aerial imagery for zooming in, from the aerial imagery to the satellite imagery for zooming out and/or when transitioning between any two types of imagery) to provide a relatively smooth visual transition for the user.

At 104, an intermediate blended image between a first image having a first image type and a first level of detail (e.g., the satellite image) and a second image having a second image type and a second level of detail (e.g., the aerial image) may be generated. The intermediate blended image may have an intermediate level of detail between the first level of detail and the second level of detail. In an example, the first image may correspond to a resolution above a high detail threshold for the first image type (e.g., a highest resolution satellite image before a level of detail transition to aerial imagery). In an example, the second image may correspond to a resolution below a low detail threshold for the second image type (e.g., a lowest resolution aerial image after a level of detail transition from the satellite imagery).

In an example of the generating, structure transfer is performed upon the first image to generate a new image, at 106. The new image may be generated, and the structure from the first image, such as the satellite image, may be transferred to the new image at the first level of detail of the first image (e.g., such that the new image has a similar resolution as the first image). In an example, structure may correspond to color differences (e.g., information related to different colors of red). At 108, the second image may be downsampled to generate a downsampled image having a downsampled size corresponding to a size of the new image. In an example, successive fine-to-coarse downsampling may be performed upon the second image (e.g., until the downsampled size of the downsampled image corresponds to the size of the new image, such as about 256 pixels by about 256 pixels) to generate the downsampled image. In an example, a Gaussian pyramid may be built based upon the successive fine-to-coarse downsampling. The Gaussian pyramid may be utilized to generate the downsampled image.

At 110, a color difference may be computed between the new image and the downsampled image (e.g., a Landsat or satellite color level difference). At 112, the color difference may be upsampled to generate an upsampled color difference. In an example of upsampling, an interpolation weight is calculated based upon a number of first levels of detail (e.g., a number of satellite levels of detail) and/or a number of second levels of detail (e.g., a number of aerial levels of detail). At 114, a gradient image may be blended using the interpolation weight and/or the upsampled color difference to generate the intermediate blended image. In an example, a blending amount metric (e.g., indicative of an amount of blending to perform based upon an amount of difference, such as color difference, between the new image and the downsampled image) may be determined based upon a gradient value of the gradient image. In this way, the gradient image may be blended based upon the blending amount metric (e.g., an amount of blending between the first image and the second image). In another example, the blending amount metric may be determined based upon a pyramid level of the gradient image within the Gaussian pyramid. In an example of blending, a horizontal partial derivative may be determined with respect to an x-axis. The horizontal partial derivative may be indicative of a horizontal color difference between pixels along the x-axis. A vertical partial derivative may be determined with respect to a y-axis. The vertical partial derivative may be indicative of a vertical color difference between pixels along the y-axis. The gradient image may be blended based upon the horizontal partial derivative and/or the vertical partial derivative.

In this way, the intermediate blended image may be generated based upon blending the gradient image. The intermediate blended image may cover an amount of ground area corresponding to an amount of ground area covered by the second image. In an example, a set of intermediate blended images between the first level of detail and the second level of detail may be generated, where the set of intermediate blended images covers an amount of ground area covered by a corresponding set of second images (e.g., set of aerial images). At 116, the intermediate blended image (e.g., and/or other intermediate blended images within the set of intermediate blended images) may be displayed through the visualization during a transition between display of the first image and display of the second image. Displaying the intermediate blended image during the transition may provide a relatively smoothly visual transition compared to an abrupt change that may otherwise occur from a direct transition from the first image to the second image. At 118, the method ends.

Figure 2:
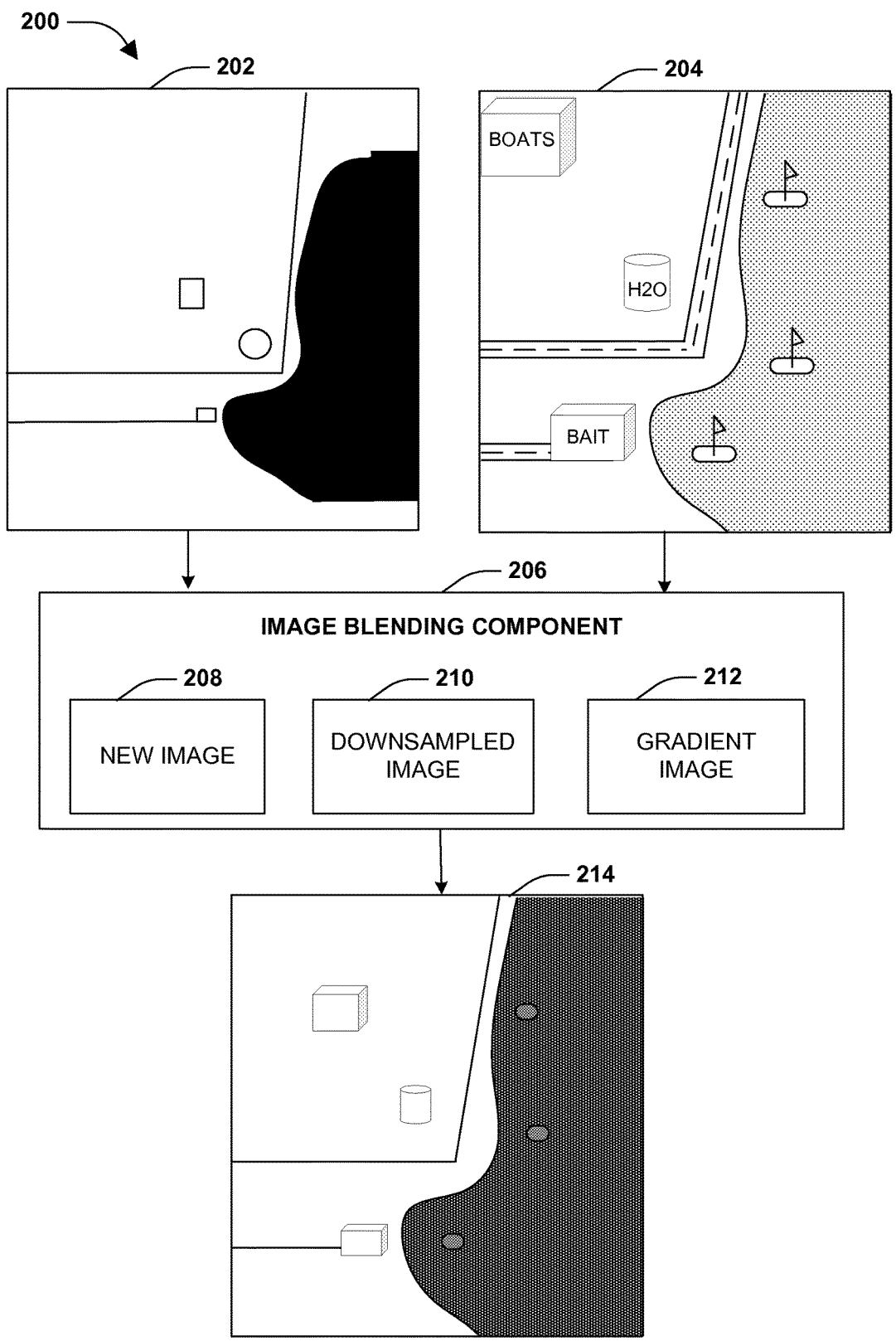
FIG. 2 is a component block diagram illustrating an exemplary system for image blending where a first intermediate blended image is generated.

FIG. 2 illustrates an example of a system 200 for image blending. The system 200 comprises an image blending component 206. The image blending component 206 may be configured to generate an intermediate blended image 214 having an intermediate level of detail between a first level of detail of a first image, such as a satellite image 202 of a beach town, and a second level of detail of a second image such as an aerial image 204 of the beach town. For example, the image blending component 206 may perform structure transfer upon the satellite image 202 to generate a new image 208 at the first level of detail. The image blending component 206 may downsample the aerial image 204 to generate a downsampled image 210 having a downsampled size corresponding to a size of the new image 208. The image blending component 206 may compute a color difference between the new image 208 and the downsampled image 210. The color difference may be upsampled to generate an upsampled color difference. The image blending component 206 may blend a gradient image 212 using an interpolation weight and/or the upsampled color difference to generate the intermediate blended image 214. In this way, the intermediate blended image 214 may be displayed during a transition (e.g., zooming in/out) between display of the satellite image 202 and display of the aerial image 204.

Figure 3:
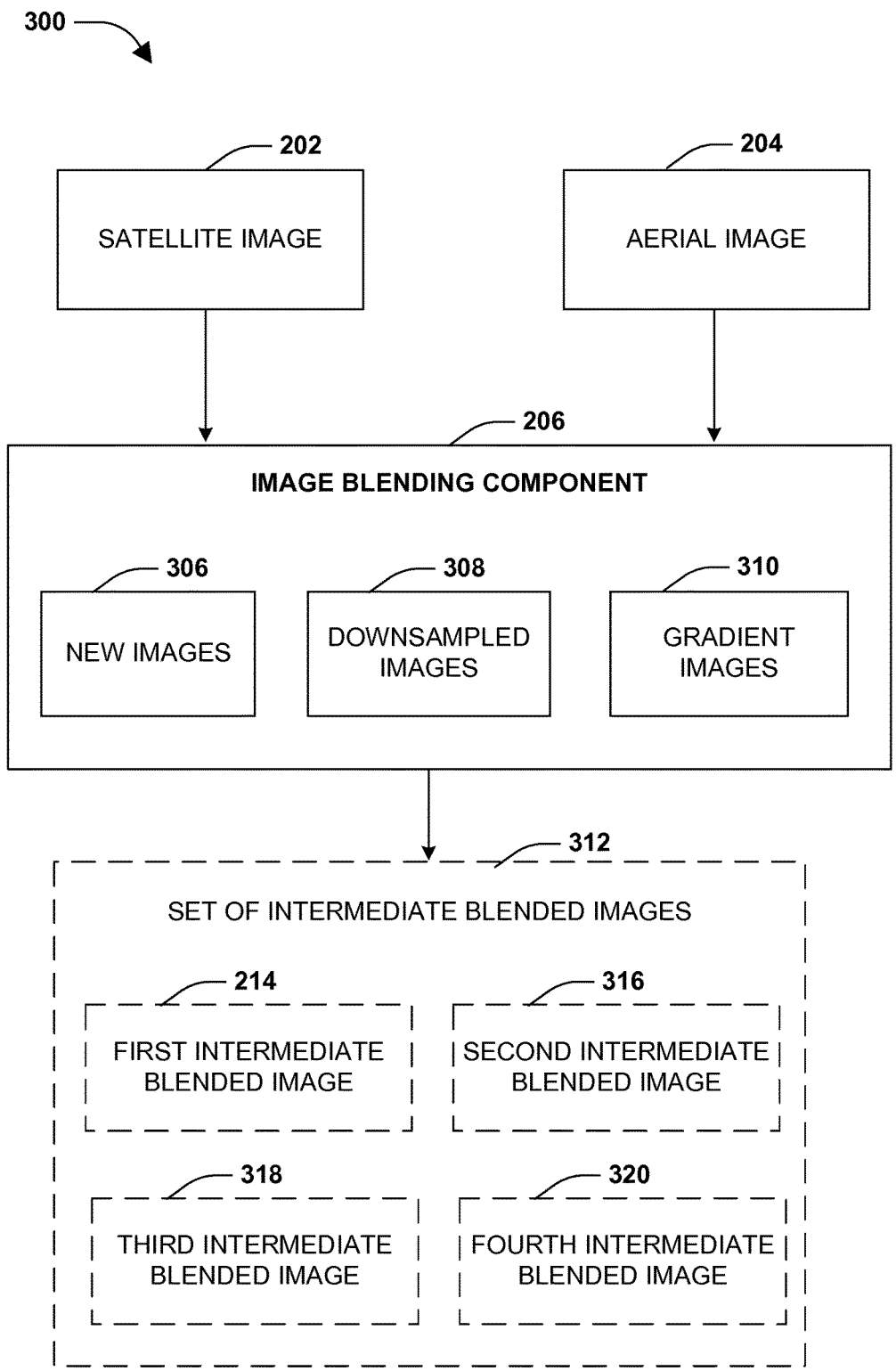
FIG. 3 illustrates an example of generating a set of intermediate blended images.

FIG. 3 illustrates an example 300 of generating a set of intermediate blended images 312. For example, the image blending component 206 may generate the first intermediate blended image 214 as illustrated in FIG. 2, a second intermediate blended image 316, a third intermediate blended image 318, a fourth intermediate blended image 320, and/or other blended images for inclusion within the set of intermediate blended images 312. The image blending component 206 may blend gradient images 310 based upon interpolation weights and/or upsampled color differences associated with new images 306 and/or downsampled images 308 derived from the satellite image 202 and/or the aerial image 204. In this way, one or more intermediate blended images within the set of intermediate blended images 312 may be displayed during a transition between display of the satellite image 202 and display of the aerial image 204.

Figure 4A:
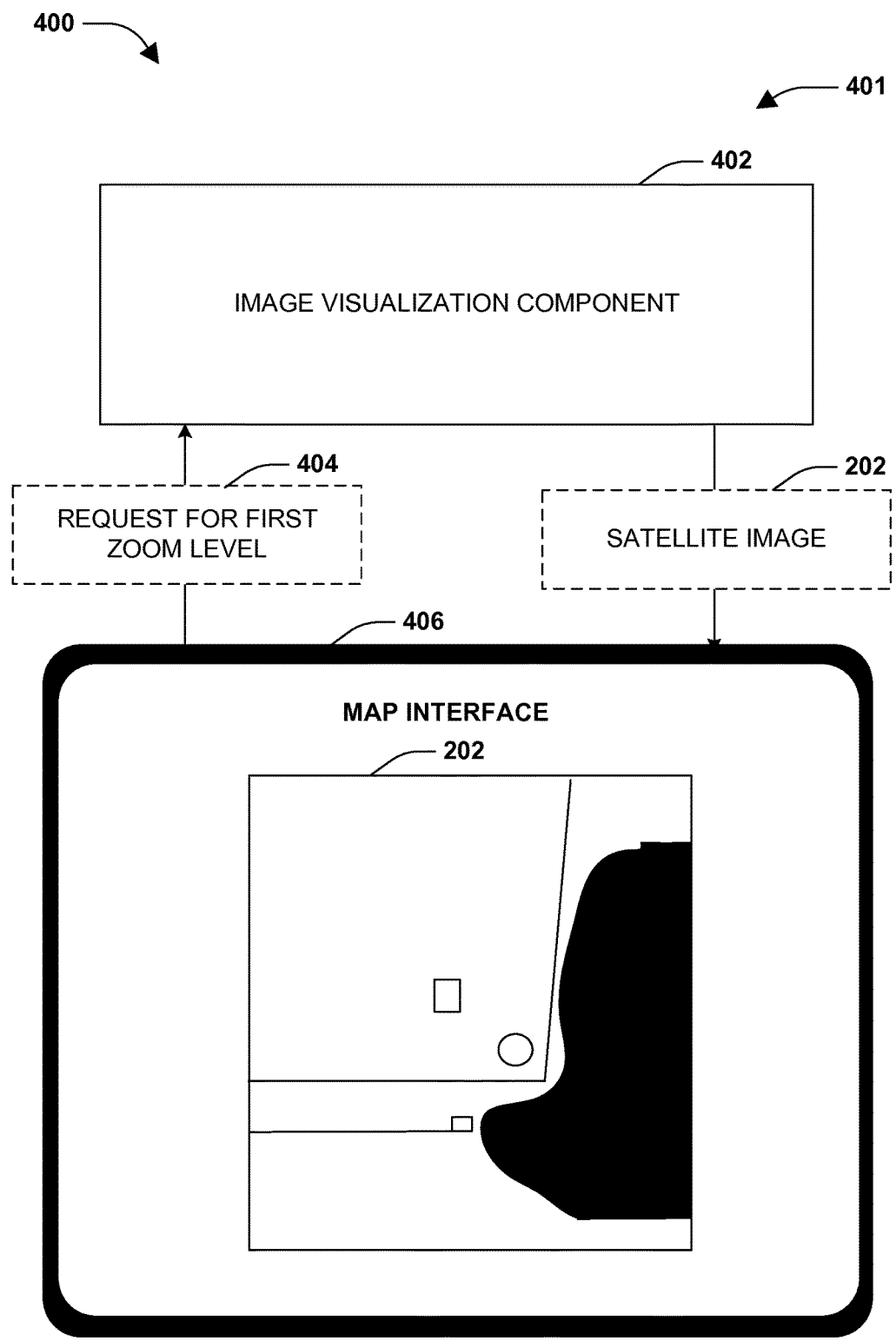
FIG. 4A is a component block diagram illustrating an exemplary system for image blending where a satellite image is displayed.

FIGS. 4A-4D illustrate examples of a system 401, comprising an image visualization component 402, for image blending and facilitating image transitions. FIG. 4A illustrates an example 400 of displaying the satellite image 202. The image visualization component 402 may be associated with a map interface 406 displayed through a client device. The map interface 406 may display a map visualization of the beach town. For example, the map interface 406 may submit a request 404 for a first zoom level of the beach town. The image visualization component 402 may receive the request 404 from the map interface 406. The image visualization component 402 may determine that the satellite image 202 corresponds to the first zoom level. Accordingly, the image visualization component 402 may provide the satellite image 202 to the map interface 406 for display through the map visualization.

Figure 4B:
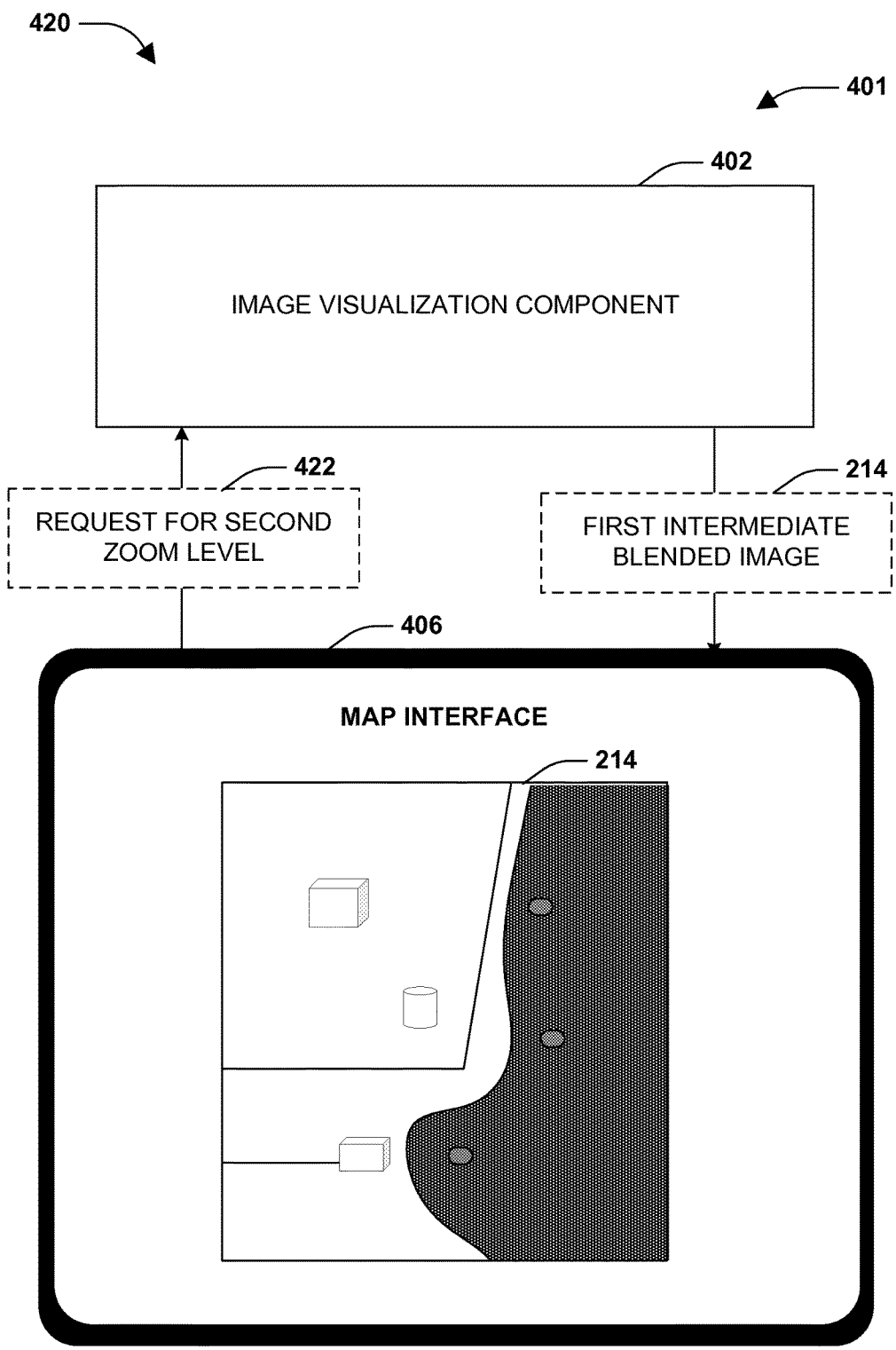
FIG. 4B is a component block diagram illustrating an exemplary system for image blending where a first intermediate blended image is displayed.
Figure 4C:
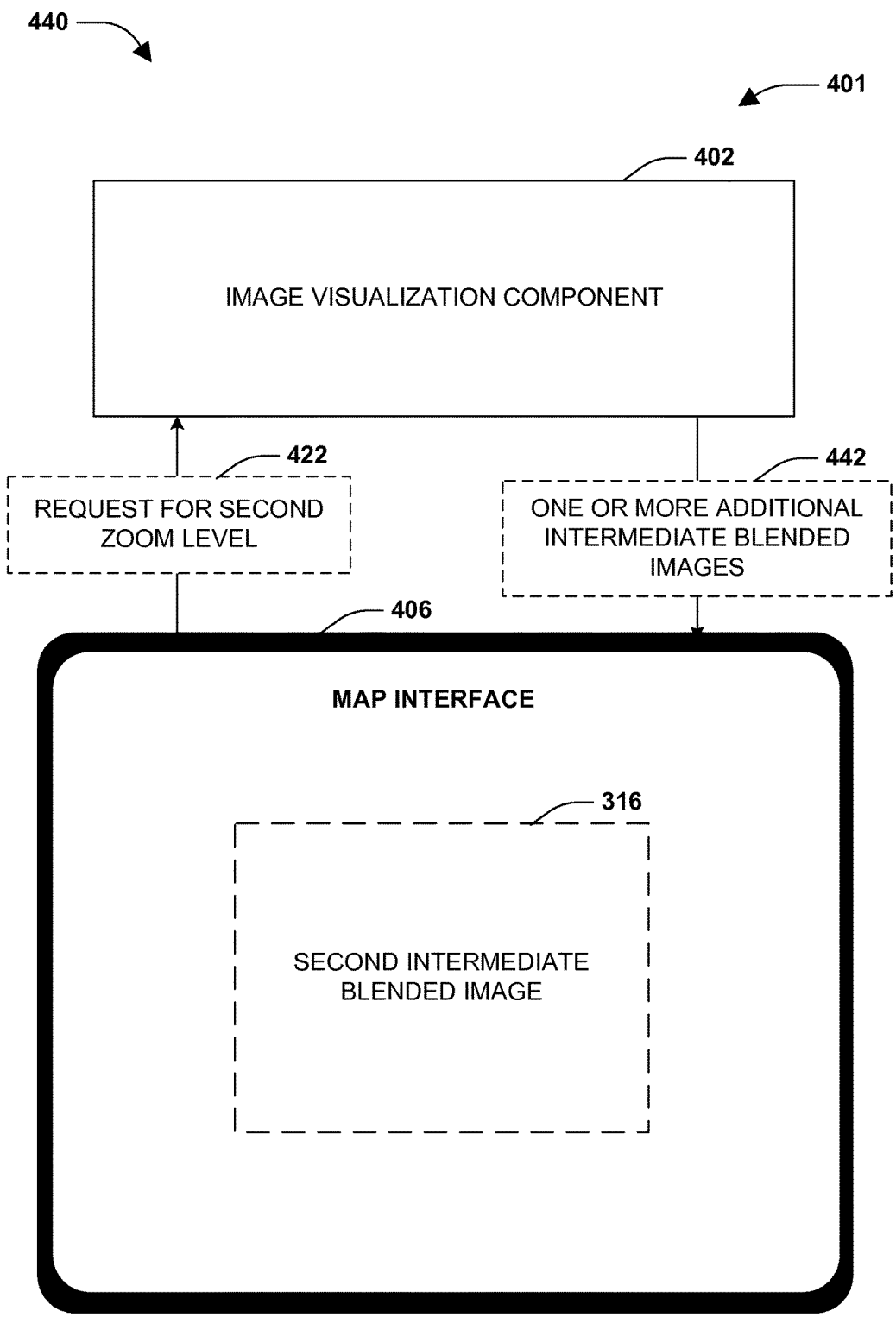
FIG. 4C is a component block diagram illustrating an exemplary system for image blending where one or more additional intermediate blended images are displayed.

FIG. 4B illustrates an example 420 of displaying the first intermediate blended image 214. The image visualization component 402 may receive a second request 422 for a second zoom level of the beach town. The image visualization component 402 may determine that the second zoom level corresponds to the aerial image 204. The image visualization component 402 may determine that a direct transition of the map visualization from display of the satellite image 202 to display of the aerial image 204 may result in an abrupt visual map experience for a user of the map visualization due to the satellite image 202 and the aerial image 204 having different visual characteristics, image types, and/or data sources. Accordingly, the image visualization component 402 may provide the first intermediate blended image 214 to the map interface 406 for display through the map visualization based upon the first intermediate blended image 214 have an intermediate level of detail between a first level of detail of the satellite image 202 and a second level of detail of the aerial image 204. FIG. 4C illustrates an example 440 of displaying one or more additional intermediate blended images 442. For example, the image visualization component 402 may determine that the one or more additional intermediate blended images 442, such as the second intermediate blended image 316, have intermediate levels of detail between the first level of detail of the satellite image 202 and the second level of detail of the aerial image 204. Accordingly, the image visualization component 402 may provide the one or more additional intermediate blended images 442 to the map interface 406 for display through the map visualization.

Figure 4D:
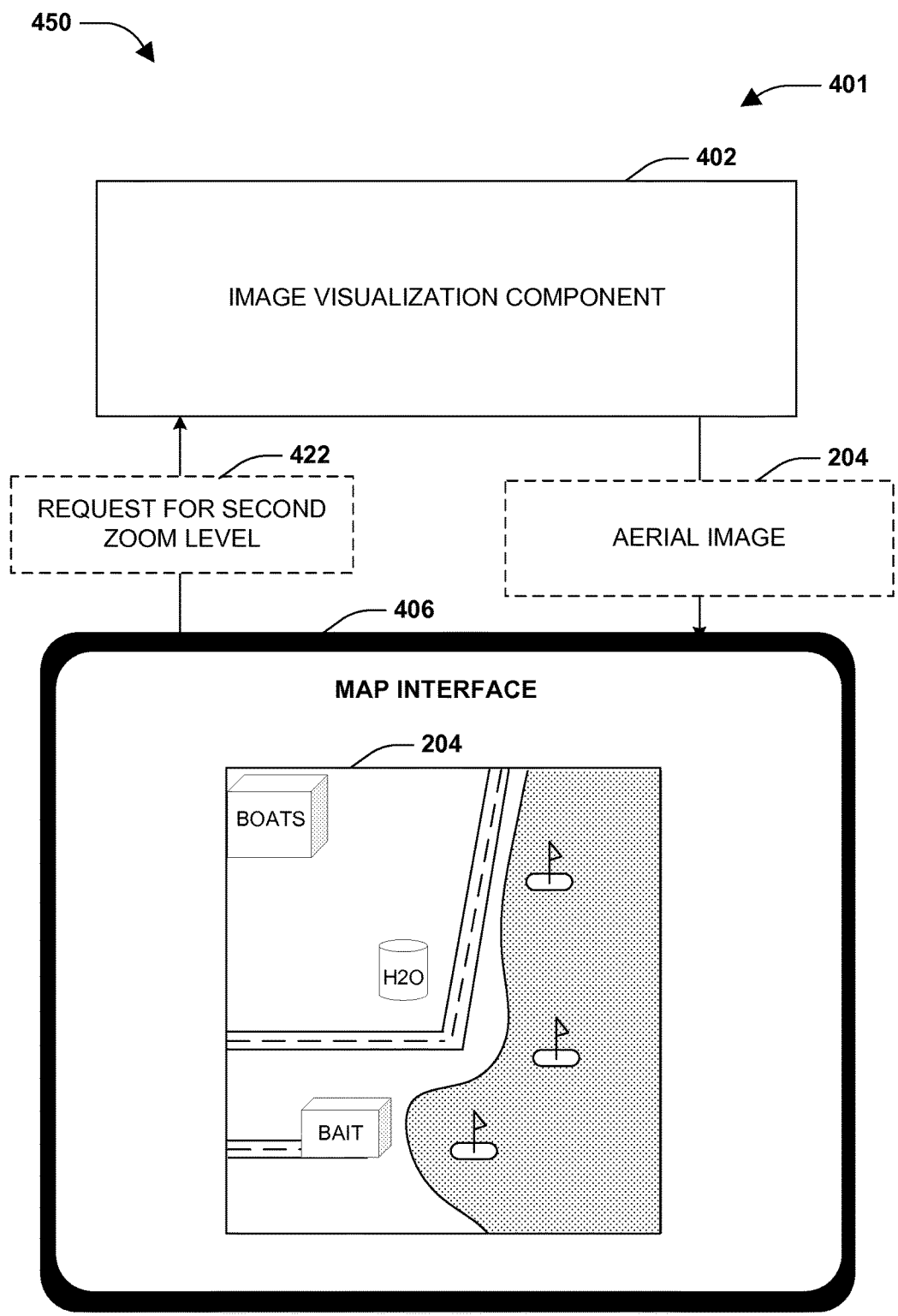
FIG. 4D is a component block diagram illustrating an exemplary system for image blending where an aerial image is displayed.

FIG. 4D illustrates an example 450 of displaying the aerial image 204. The image visualization component 402 may determine that the aerial image 204 corresponds to the second zoom level associated with the second request 422.

Accordingly, the image visualization component 402 may provide the aerial image 202 to the map interface 406 for display through the map visualization based upon a threshold number of intermediate images being displayed after display of the satellite image 202 and before display of the aerial image 202, as illustrated in FIGS. 4B and 4C.

Figure 5:
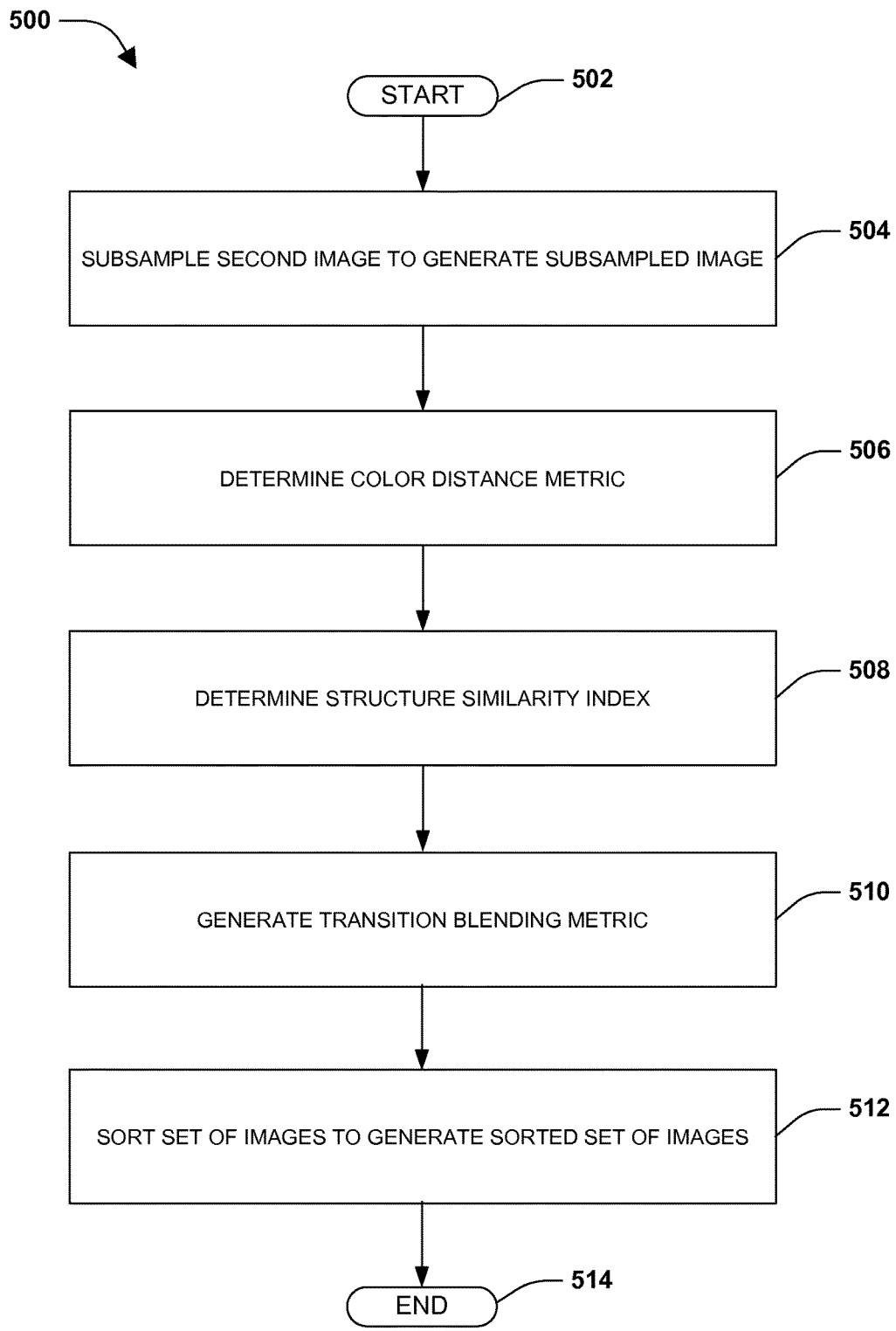
FIG. 5 is a flow diagram illustrating an exemplary method of facilitating image transitions.

An embodiment of facilitating image transitions is illustrated by an exemplary method 500 of FIG. 5. At 502, the method starts. In an example, a set of images may correspond to intermediate blended images having intermediate levels of detail between a first level of detail of a first image (e.g., a satellite image) and a second level of detail of a second image (e.g., an aerial image). One or more intermediate blended images may be displayed through a visualization during a transition of the visualization from display of the first image to display of the second image. The set of images may be sorted from smooth transitions to abrupt transitions so that the one or more intermediate blended images may be selected from the set of images in order to provide a relatively smooth visual transition from the first image to the second image.

In an example of sorting the set of images, the second image, having a second image type and the second level of detail, may be subsampled to generate a subsampled image, at 504. The subsampled image may have a subsampled size corresponding to a size of the first image having a first image type and the first level of detail. At 506, a color distance metric between the subsampled image and the first image may be determined (e.g., distance between DC components (e.g., Fourier transforms) of the subsampled image and the first image, which may corresponding to a normalized color distance). At 508, a structure similarity metric between the subsampled image and the first image may be determined (e.g., structure similarity between DC components of the subsampled image and the first image, which may correspond to texture differences).

At 510, a transition blending metric may be generated based upon the color distance metric and/or the structure similarity metric (e.g., the structure similarity metric may be subtracted from the color distance metric). The larger the transition blending metric, the more dissimilarity between the subsampled image and the first image. The transition blending metric may indicate how many levels of detail to blend between the first level of detail of the first image and the second level of detail of the second image.

At 512, the set of images may be sorted based upon the transition blending metric to create a sorted set of images ordered from smooth transitions to abrupt transitions between displaying the first image and displaying the second image. In an example, a transition outlier threshold may be defined based upon a user threshold for outliers. The set of images may be sorted based upon the transition outlier threshold. The sorted set of images may be represented as a sorted array of quadkeys, where a quadkey corresponds to an image within the sorted set of images. In this way, the sorted set of images may comprise intermediate blended images sorted based upon transitional smoothness, which may aid a user in efficiently identifying potential issues with intermediate blended images. At 514, the method ends.

Figure 6:
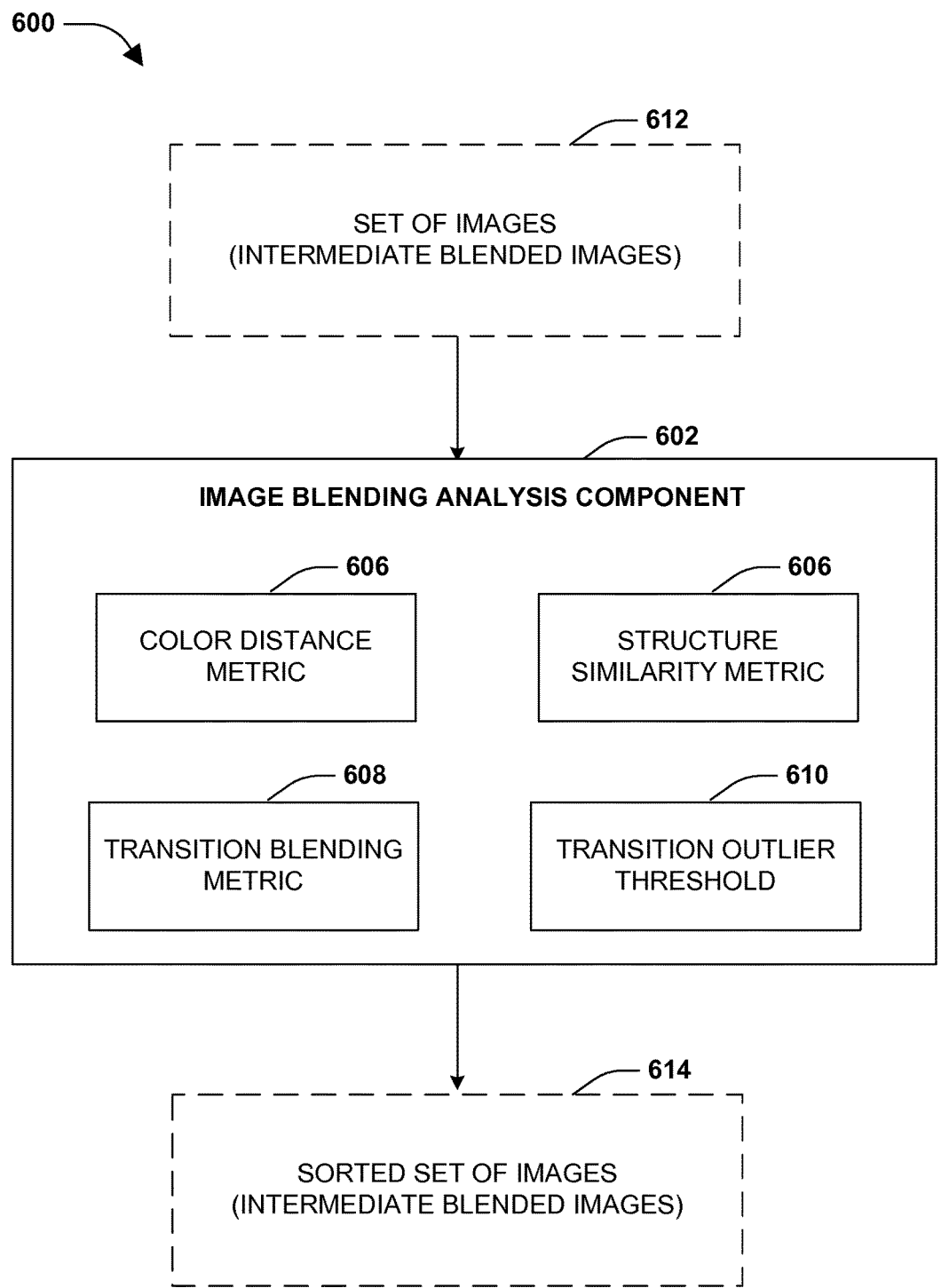
FIG. 6 is a component block diagram illustrating an exemplary system for facilitating image transitions.

FIG. 6 illustrates an example of a system 600 for facilitating image transitions. The system 600 comprises an image blending analysis component 602. The image blending analysis component 602 may identify a set of images 612 that are to be sorted and/or blended. In an example, the set of images 612 may correspond to intermediate blended images. The image blending analysis component 602 may subsample a second image (e.g., an aerial image), having a second image type and a second level of detail, to create a subsampled image having a subsampled size corresponding to a size of a first image (e.g., a satellite image) having a first image type and a first level of detail. The image blending analysis component 602 may determine a color distance metric 606 between the subsampled image and the first image. The image blending analysis component 602 may determine a structure similarity metric 606 between the subsampled image and the first image. The image blending analysis component 602 may generate a transition blending metric 608 based upon the color distance metric 606 and the structure similarity metric 606. The image blending analysis component 602 may sort the set of images 612 based upon the transition blending metric 608 and/or a transition outlier threshold 610 to create a sorted set of images 614. The sorted set of images 614 may be ordered from smooth transitions to abrupt transitions between displaying the first image and displaying the second image. The image visualization component 402 may be configured to display one or more intermediate blended images from the sorted set of images 614 (e.g., intermediate blended images having a sorted order above a transitional smoothness threshold) between display of the first image and display of the second image.

According to an aspect of the instant disclosure, a method for image blending is provided. The method includes generating an intermediate blended image between a first image, having a first image type and a first level of detail, and a second image having a second image type and a second level of detail. The intermediate blended image may have an intermediate level of detail between the first level of detail and the second level of detail. The generating comprises performing structure transfer upon the first image to generate a new image. The second image may be downsampled to generate a downsampled image having a downsampled size corresponding to a size of the new image. A color difference between the new image and the downsampled image may be computed. The color difference may be upsampled to generate an upsampled color difference. A gradient image may be blended using an interpolation weight and the upsampled color difference to generate the intermediate blended image. The intermediate blended image may be displayed through a visualization during a transition between display of the first image and display of the second image.

According to an aspect of the instant disclosure, a method for facilitating image transitions is provided. The method includes subsampling a second image, having a second image type and a second level of detail, to generate a subsampled image. The subsampled image may have a subsampled size corresponding to a size of a first image having a first image type and first level of detail. A color distance metric between the subsampled image and the first image may be determined. A structure similarity metric between the subsampled image and the first image may be determined. A transition blending metric may be generated based upon the color distance metric and the structure similarity metric. A set of images may be sorted based upon the transition blending metric to generate a sorted set of images ordered from smooth transitions to abrupt transitions between displaying the first image and displaying the second image.

According to an aspect of the instant disclosure, a system for image blending is provided. The system includes an image blending component configured to generate an intermediate blended image between a first image, having a first image type and a first level of detail, and a second image having a second image type and a second level of detail. The intermediate blended image may have an intermediate level of detail between the first level of detail and the second level of detail. The image blending component may be configured to perform structure transfer upon the first image to generate a new image. The image blending component may be configured to downsample the second image to generate a downsampled image having a downsampled size corresponding to a size of the new image. The image blending component may be configured to compute a color difference between the new image and the downsampled image. The image blending component may be configured to upsample the color difference to generate an upsampled color difference. The image blending component may be configured to blend a gradient image using an interpolation weight and the upsampled color difference to generate the intermediate blended image. The system includes an image visualization component configured to display the intermediate blended image through a visualization during a transition between display of the first image and display of the second image.

According to an aspect of the instant disclosure, a means for image blending is provided. An intermediate blended image between a first image, having a first image type and a first level of detail, and a second image, having a second image type and a second level of detail, may be generated by the means for image blending. The intermediate blended image may have an intermediate level of detail between the first level of detail and the second level of detail. The generating comprises performing structure transfer upon the first image to generate a new image. The second image may be downsampled by the means for image blending to generate a downsampled image having a downsampled size corresponding to a size of the new image. A color difference between the new image and the downsampled image may be computed by the means for image blending. The color difference may be upsampled by the means for image blending to generate an upsampled color difference. A gradient image may be blended by the means for image blending using an interpolation weight and the upsampled color difference to generate the intermediate blended image. The intermediate blended image may be displayed by the means for image blending through a visualization during a transition between display of the first image and display of the second image.

According to an aspect of the instant disclosure, a means for facilitating image transitions is provided. A second image, having a second image type and a second level of detail, may be subsampled by the means for facilitating image transitions to generate a subsampled image. The subsampled image may have a subsampled size corresponding to a first image having a first image type and first level of detail. A color distance metric between the subsampled image and the first image may be determined by the means for facilitating image transitions. A structure similarity metric between the subsampled image and the first image may be determined by the means for facilitating image transitions. A transition blending metric may be generated by the means for facilitating image transitions based upon the color distance metric and the structure similarity metric. A set of images may be sorted by the means for facilitating image transitions based upon the transition blending metric to generate a sorted set of images ordered from smooth transitions to abrupt transitions between displaying the first image and displaying the second image.

Figure 7:
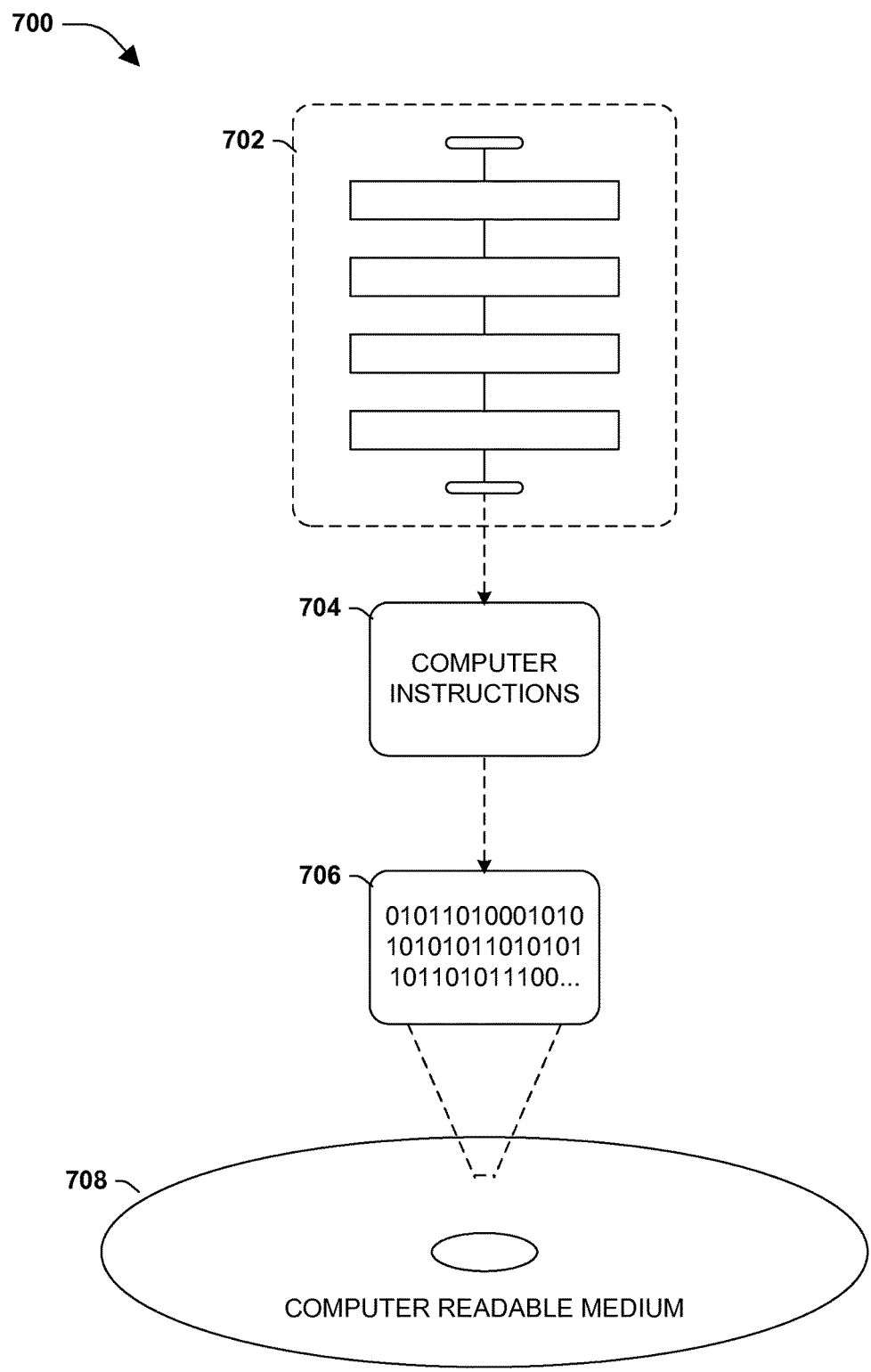
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1 and/or at least some of the exemplary method 500 of FIG. 5, for example. In some embodiments, the processor-executable instructions 704 are configured to implement a system, such as at least some of the exemplary system 200 of FIG. 2, at least some of the exemplary system 401 of FIGS. 4A-4D, and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
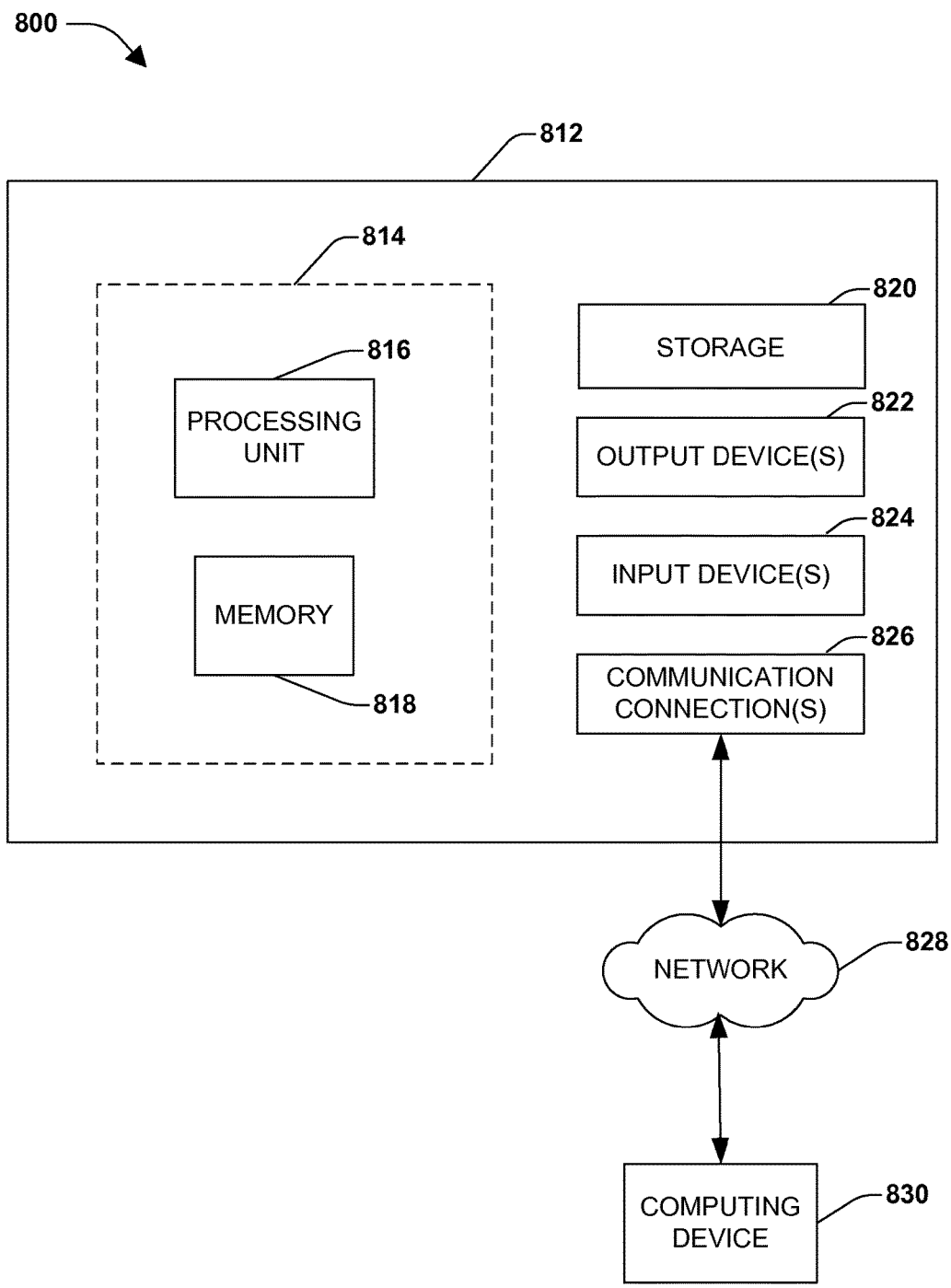
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for image blending, comprising:
   generating an intermediate blended image between a first image, having a first image type and a first level of detail, and a second image having a second image type and a second level of detail, the intermediate blended image having an intermediate level of detail between the first level of detail and the second level of detail, the generating comprising:
   performing structure transfer upon the first image to generate a new image;
   downsampling the second image to generate a downsampled image having a downsampled size corresponding to a size of the new image;
   computing a color difference between the new image and the downsampled image;
   upsampling the color difference to generate an upsampled color difference; and
   blending a gradient image using an interpolation weight and the upsampled color difference to generate the intermediate blended image, the blending the gradient image comprising determining a blending amount metric based upon a gradient value of the gradient image and then blending the gradient image based upon the blending amount metric; and
   displaying the intermediate blended image through a visualization during a transition between display of the first image and display of the second image.

2. The method of claim 1, the first image comprising a satellite image and the second image comprising an aerial image.

3. The method of claim 1, comprising:
   generating a set of intermediate blended images between the first level of detail and the second level of detail; and
   displaying the set of intermediate blended images through the visualization during the transition between display of the first image and display of the second image.

4. The method of claim 1, the downsampling the second image comprising:

performing successive fine-to-coarse downsampling upon the second image to generate the downsampled image.

5. The method of claim 4, the downsampling the second image comprising:
building a Gaussian pyramid based upon the successive fine-to-coarse downsampling; and
utilizing the Gaussian pyramid to generate the downsampled image.

6. The method of claim 1, the intermediate blended image covering an amount of ground area corresponding to a first amount of ground area covered by the first image.

7. The method of claim 1, the intermediate blended image covering an amount of ground area corresponding to a second amount of ground area covered by the second image.

8. The method of claim 1, the blending comprising:
determining a horizontal partial derivative with respect to an x-axis, the horizontal partial derivative indicative of a horizontal color difference between pixels along the x-axis; and
blending the gradient image based upon the horizontal partial derivative.

9. The method of claim 1, the blending comprising:
determining a vertical partial derivative with respect to a y-axis, the vertical partial derivative indicative of a vertical color difference between pixels along the y-axis; and
blending the gradient image based upon the vertical partial derivative.

10. A method for image blending, comprising:
generating an intermediate blended image between a first image, having a first image type and a first level of detail, and a second image having a second image type and a second level of detail, the intermediate blended image having an intermediate level of detail between the first level of detail and the second level of detail, the generating comprising:
performing structure transfer upon the first image to generate a new image;
downsampling the second image to generate a downsampled image having a downsampled size corresponding to a size of the new image;
computing a color difference between the new image and the downsampled image;
upsampling the color difference to generate an upsampled color difference; and
blending a gradient image using an interpolation weight and the upsampled color difference to generate the intermediate blended image, the blending the gradient image comprising building a Gaussian pyramid based upon successive fine-to-coarse downsampling performed upon the second image and then determining a blending amount metric based upon a pyramid level of the gradient image within the Gaussian pyramid; and
displaying the intermediate blended image through a visualization during a transition between display of the first image and display of the second image.

11. The method of claim 10, the first image comprising a satellite image and the second image comprising an aerial image.

12. The method of claim 10, comprising:
generating a set of intermediate blended images between the first level of detail and the second level of detail; and
displaying the set of intermediate blended images through the visualization during the transition between display of the first image and display of the second image.

13. The method of claim 10, the downsampling the second image comprising:
building a Gaussian pyramid based upon successive fine-to-coarse downsampling performed on the second image; and
utilizing the Gaussian pyramid to generate the downsampled image.

14. The method of claim 10, the blending comprising:
either determining a horizontal partial derivative with respect to an x-axis, the horizontal partial derivative indicative of a horizontal color difference between pixels along the x-axis or determining a vertical partial derivative with respect to a y-axis, the vertical partial derivative indicative of a vertical color difference between pixels along the y-axis; and
blending the gradient image based upon either the horizontal partial derivative or vertical partial derivative.

15. A method for image blending, comprising:
generating an intermediate blended image between a first image, having a first image type and a first level of detail, and a second image having a second image type and a second level of detail, the intermediate blended image having an intermediate level of detail between the first level of detail and the second level of detail, the generating comprising:
performing structure transfer upon the first image to generate a new image;
downsampling the second image to generate a downsampled image having a downsampled size corresponding to a size of the new image;
computing a color difference between the new image and the downsampled image;
upsampling the color difference to generate an upsampled color difference; and
blending a gradient image using an interpolation weight and the upsampled color difference to generate the intermediate blended image, the blending the gradient image comprising: either determining a horizontal partial derivative with respect to an x-axis, the horizontal partial derivative indicative of a horizontal color difference between pixels along the x-axis or determining a vertical partial derivative with respect to a y-axis, the vertical partial derivative indicative of a vertical color difference between pixels along the y-axis, and then blending the gradient image based upon either the horizontal partial derivative or vertical partial derivative; and
displaying the intermediate blended image through a visualization during a transition between display of the first image and display of the second image.

16. The method of claim 15, comprising:
generating a set of intermediate blended images between the first level of detail and the second level of detail; and
displaying the set of intermediate blended images through the visualization during the transition between display of the first image and display of the second image.

17. The method of claim 15, the downsampling the second image comprising:
building a Gaussian pyramid based upon successive fine-to-coarse downsampling performed on the second image; and
utilizing the Gaussian pyramid to generate the downsampled image.

18. The method of claim 15, the intermediate blended image covering an amount of ground area corresponding to a first amount of ground area covered by the first image, the first image comprising a satellite image.

19. The method of claim 15, the intermediate blended image covering an amount of ground area corresponding to a second amount of ground area covered by the second image, the second image comprising an aerial image.

* * * * *